March 14, 1967
R. E. RIEBS
3,309,572
ELECTRIC POWER SYSTEM HAVING SECTIONALIZING
MEANS AND CONTROL CIRCUIT THEREFOR
Filed Oct. 5, 1964
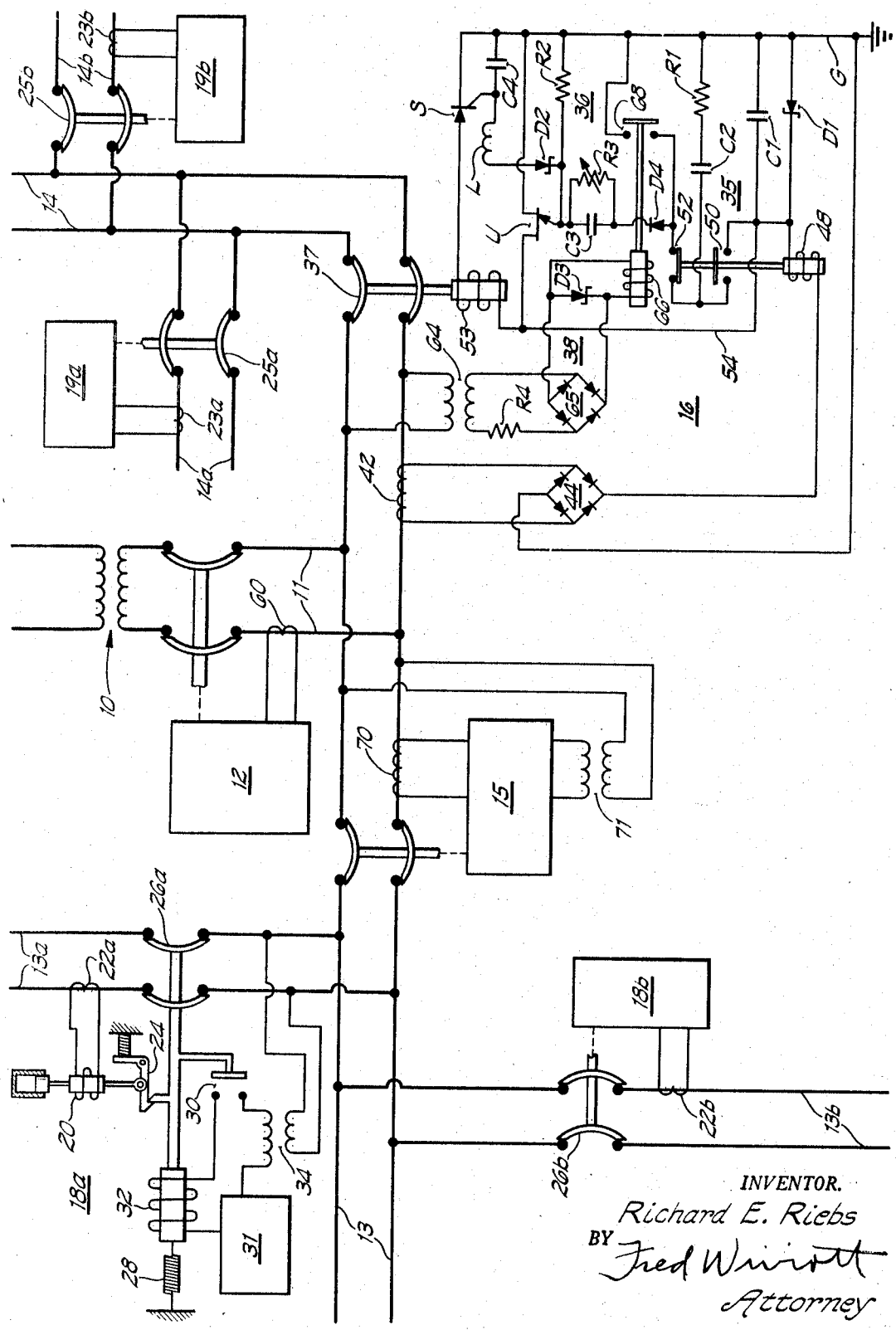
INVENTOR.
Richard E. Riebs
BY Fred Wiirott
Attorney

United States Patent Office 3,309,572
Patented Mar. 14, 1967

3,309,572
ELECTRIC POWER SYSTEM HAVING SECTIONALIZING MEANS AND CONTROL CIRCUIT THEREFOR
Richard E. Riebs, Hales Corners, Wis., assignor to McGraw-Edison Company, Milwaukee, Wis., a corporation of Delaware
Filed Oct. 5, 1964, Ser. No. 401,361
14 Claims. (Cl. 317—22)

This invention relates to sectionalizer switch control circuits and, more particularly, to a sectionalizer switch control circuit having particular but not exclusive application to a system having a plurality of repeating circuit interrupters and sectionalizer switches.

It has been the practice in electrical power systems to employ a variety of coordinated protective devices, such as repeating circuit interrupters, sectionalizing switches and fuses. Repeating circuit interrupters are devices which are operative upon the occurrence of a fault current to exercise a series of opening and reclosing operations which terminate in a locked-open position if the fault does not clear during the intervening period. A sectionalizing switch is a device which senses the appearance and disappearance of fault current resulting from the opening and reclosing of the repeating circuit interrupter and is operative after a predetermined number of such appearances or disappearances, usually three, to open the circuit. Because sectionalizing switches usually do not have fault current interrupting capabilities, the contacts open while the contacts of the coordinated circuit interrupter are open.

In order to coordinate repeating circuit interrupters and reclosers with fuses in the same system, the initial switch opening operations of the repeating circuit interrupters are rapid so that the fuse elements will not melt. The final opening operations of the repeating circuit interrupters are time-delayed, however, so that if the fault exists in a fuse-protected section of the system, the fuse elements will melt to isolate the fault whereby the repeating circuit interrupter may reclose and restore service to the non-faulted portions of the system.

In most power systems the power source or substation is usually protected by a station breaker. When the outgoing line from the substation splits into two sections, the operation of the station breaker to lockout will open-circuit both sections, causing the loss of service in the entire system and making it difficult for the line crew to determine in which line to search for the fault. While this can be corrected by adding two repeating circuit interrupters where the circuit splits, this is relatively expensive and complicates the problem of system coordination.

It is an object of the invention to provide a system having a plurality of feeder lines radiating from a main line wherein a fault in one of the feeder lines may be isolated from the source by the use of a repeating circuit interrupter in the main line and a sectionalizing switch in each feeder line.

Another object of the invention is to provide a sectionalizing switch having disabling means responsive to source side system integrity.

A further object of the invention is to provide a sectionalizing switch with voltage sensing means which renders the sectionalizing switch non-operative when there is source voltage in the system.

These and other objects and advantages of the instant invention will become more apparent from a detailed description thereof taken with the accompanying drawing which schematically illustrates the instant invention.

Referring to the drawing in greater detail, an electrical power system is illustrated as having a source of power symbolized by a transformer 10 and having a main line section 11 in series with the source of power. The transformer 10 will normally be located in a substation and be protected by a substation repeating circuit interrupter 12. The main line 11 splits into two feeder lines 13 and 14, each of which has a plurality of radiating branch lines 13a and 13b and 14a and 14b, respectively. Sectionalizing switches 15 and 16 are respectively connected in the feeder lines 13 and 14 adjacent the main line 11. In addition, repeating circuit interrupters 18a and 18b respectively connected in the branch lines 13a and 13b, adjacent the feeder line 13 and repeating circuit interrupters 19a and 19b are respectively connected to the branch lines 14a and 14b adjacent the feeder line 14.

Each of the repeating circuit interrupters 12, 18a, 18b, 19a and 19b will, in general, operate in the same manner and include the same general operating components. For this reason, only the repeating circuit interrupter 18a is schematically illustrated, the remainder being shown in symbolic form. It will be understood, however, that any type of repeating circuit interrupter well known in the art may be employed at these locations.

Referring now to the repeating circuit interrupter 18a, those skilled in the art will appreciate that upon the occurrence of a fault in the branch line 13a, the trip coil 20 of the repeating circuit interrupter 18a, senses the fault through a current transformer 22, which couples it to the branch line 13a. After a time delay, the trip coil 20 releases a latch 24 which allows the main switch 26 to open under the influence of an opening spring 28. When the main switch 26 reaches its fully open position, an auxiliary switch 30 is closed to couple a reclosing coil 32 to the source side of contacts 26 through a step-down transformer 34, so that the main switch 26 is reclosed.

If the fault is cleared during this opening and reclosing cycle, the main switch 26 will remain closed. If, however, the fault does not clear during this interval, there follows a predetermined number of successive opening and closing operations, usually four. If the fault does not disappear during this series of successive operations, operation counting and lockout means 31 becomes operative to prevent energization of the closing coil 32 whereupon the circuit interrupter 18a is locked open.

The details of the automatic circuit interrupter just discussed form no part of the invention and, therefore have been schematically illustrated and described in general terms. For a more complete description of a circuit interrupter capable of performing these functions, reference is made to Patent 2,926,228 which is assigned to the assignee of the instant invention.

The sectionalizing switches 15 and 16 are also identical and, for this reason, only sectionalizing switch 16 will be discussed in detail. The sectionalizing switch 15 is merely illustrated in symbolic form, for the sake of brevity.

Referring now to the sectionalizing switch 16, it is shown to include a control circuit having an integrating portion 35, an operating portion 36 for actuating the main switch 37 and a voltage sensing portion 38. The integrating portion 35 is operable to count the number of appearances and disappearances of overload current in the branch line 14 and to actuate the operating portion 36 after a predetermined number thereof so that the main switch 37 will open. The voltage sensing portion 38 prevents the operation of the integrating portion 35 when line voltage appears in the feeder line 14.

The integrating portion 35 includes an energy source capacitor C1 coupled to the branch line 14 by means of a current transformer 42 and a bridge-type rectifier 44. In this manner, the rectifier current in the secondary of current transformer 42 maintains the energy source capacitor C1 fully charged. In order to limit the voltage across the energy source capacitor C1 to a desired value, it is hunted by a Zener diode D1 which bypasses the charging current around said capacitor when the latter is fully charged.

The operating coil 48 of an overcurrent relay is connected in series with the changing circuit of the energy source capacitor C1 and includes normally open contacts 50 and normally closed contacts 52. A first integrating capacitor C2 is connected in series with a resistor R1 and the combination is connectable in parallel with the energy source capacitor C1 through the normally open contacts 50 of over-current relay 48. In addition, a second integrating capacitor C3 is connected in series with a resistor R2 and the combination is connected in parallel with the series combination of capacitor C2 and resistor R1 through the normally closed contacts 52 of overcurent relay 48. An adjustable leakage resistor R3 is connected in shunt with the second integrating capacitor C3.

The operating portion 36 of the sectionalizing switch 16 includes a trip coil 53 for opening the main contacts 37 and which is connected in series with the anode cathode circuit of a controlled rectifier S and the series combination connected in parallel with the source capacitor C1 by a conductor 54. The operating portion 36 also includes a uni-junction transistor U having an emitter connected to the junction between capacitor C3 and resistor R2, a base-one electrode connected to the ground bus G and a base-two electrode connected to conductor 54. In addition, a Zener diode D2 and an inductor L are connected in series between the gate electrode of the controlled rectifier S and the emitter of uni-junction U and a capacitor C4 is connected between the gate electrode of controlled rectifier S and the ground bus G.

The voltage sensing circuit 38 includes a potential transformer 64 having a primary winding connected to the branch line 14 and a secondary winding connected through a resistor R4 to the input terminals of a full wave rectifier 65. A Zener diode D3 is connected to the output terminals of rectifier 65 and the coil of a relay 66 is connected in parallel with the diode D3. Relay 66 also includes normally open contacts 68 which shunt the series combination of resistor R2 and capacitor C3. As long as voltage appears in the feeder line 14, relay 66 will be energized to maintain contacts 68 closed. Isolating diode D4 prevents capacitor C3 from discharging through contacts 68 should they be closed after an integrating operation has begun.

Voltage sensing circuit 38 functions to sense the integrity of the circuit between sectionalizing switch 16 and the source 10, or in other words, whether repeating circuit interrupter 12 is open or closed. This is accomplished by sensing the existence of an electrical quantity in the system, in this case voltage. If voltage is present, indicating that circuit interrupter 12 is closed and source side integrity exists, relay 66 will be energized and contacts 68 opened. On the other hand, if voltage is absent, indicating that circuit interrupter 12 is open and source side integrity does not exist, relay 66 will be de-energized and contact 68 closed. It will be obvious to those skilled in the art that system current could also be sensed as an indication of source side integrity.

It will be appreciated that if a fault current appears in the main line 11, the feeder line 14, or either of the branch lines 14a or 14b, fault current will flow from the source 10 to the point of the fault. The repeating circuit interrupters will be so adjusted that the opening time delays of interrupter 12 will be longer than that of the interrupters 18a, 18b, 19a and 19b. Should a fault occur in the branch line 14a, therefore, it will be sensed by the overcurrent coil 60 of repeating circuit interrupter 12 and the overcurrent coil 23a of the repeating circuit interrupter 19a. However, because the opening time of the repeating circuit interrupter 19a is shorter than that of repeating circuit interrupter 12, interrupter 19a will operate to isolate the fault and therefore interrupt the flow of fault current through the current sensing coil of the circuit interrupter 12. As a result, the circuit interrupter 12 will not operate when there is a fault in any of the branch lines 13a, 13b, 14a or 14b. On the other hand, should the fault current occur in the main line 11, or either of the feeder lines 13 or 14, it will not be sensed by the over-current coils of any of the repeating circuit interrupters 18a, 18b, 19a or 19b and, as a result, it will cause the operation of the circuit interrupter 12. It can thus be seen that faults in the main line 11 and in the feeder lines 13 or 14 will cause the operation of the circuit breaker 12 while faults in any of the branch lines 13a, 13b, 14a or 14b will actuate the corresponding circuit interrupter 18a, 18b, 19a or 19b.

It will be appreciated, too, that if the repeating circuit interrupter 12 were permitted to cycle to lockout upon the occurrence of a fault in the feeder line 14, for example, the permanent opening of its contacts would also interrupt the non-faulted feeder line 13 and each of the branch lines 13a and 13b. For this reason, the sectionalizing switches 15 and 16 are provided. Sectionalizer switch 15 will open branch line 13 upon the appearance of a permanent fault in branch line 13 and thereby allow the circuit breaker 12 to reclose and continue service to the non-faulted branch line 14. Similarly, sectionalizing switch 16 will open upon the occurrence of a permanent fault in feeder line 14 so that service may be maintained in a non-faulted feed line 13.

Examining the operation of the sectionalizing switches more specifically, assume that a fault occurs in the feeder line 14 causing an excess current to flow from the source 10 through the branch line 14 to the point of the fault. This will result in an increased rectified current in the operating coil of relay 48 of sectionalizing switch 15 causing it to close its normally open contacts 50 and open its normally closed contacts 52. As a result, the first integrating capacitor C2 is connected in parallel with the energy source capacitor C1 so that a portion of the charge in capacitor C1 is redistributed on capacitor C2. Since the fault current also causes the operation of the repeating circuit interrupter 12, both current and voltage will be interrupted in feeder line 14 subsequent to the operation of the relay 48 and the charging of capacitor C2.

Upon the interruption of fault current and voltage in feeder line 14, relays 48 and 66 drop out, opening contacts 50 and 68, respectively, to isolate capacitor C2 from capacitor C1. In addition, contacts 52 of relay 48 close to connect capacitors C2 and C3 to place across both the emitter-base-one circuit of uni-junction transistor U and resistor R2, a voltage equal to the difference between the voltages across capacitors C2 and C3. Upon the initial operation of the sectionalizing switch 16, the charge on capacitor C3 will be substantially zero, so that this difference in potential will be substantially the entire voltage across capacitor C2. As a result, the voltage across the emitter-base-one circuit of uni-junction transistor U will be substantially equal to that across capacitor C2 while the potential across its base-one-base-two circuit will be equal to the voltage across the energy storage capacitor C1. The capacitances of capacitors C1, C2 and C3 are chosen so that during the initial operation, the voltage impulse occurring across resistor R2 will be sufficiently large to cause uni-junction transistor U to break down and conductor emitter-base-one current to complete a charging circuit between capacitors C2 and C3. The voltage impulse appearing across R2 as the result of the breakdown of uni-junction transistor U will be short-lived. Inductor L appears as a high impedance to a voltage pulse of short duration and capacitor C4 appears as a low impedance to such a voltage impulse. Therefore, very little charge will accumulated in capacitor C4.

Should the fault in the feeder line 14 clear during the first circuit interruption, the charge in capacitors C2 and C3 will slowly leak off through a path defined by resistors R2 and R3. On the other hand, should the fault in feeder line 14 persist upon the reclosing of the circuit interrupter 12, relay 48 will again pull in, closing contacts 50 and opening contacts 52. Once again, some of the charge in capacitor C1 will flow to capacitor C2 until the voltage across the two is again equal. When the fault current in feeder line 14 is again interrupted by the repeating circuit interrupter 12, relays 48 and 66 will drop out so that contacts 50 and 68 are opened to disconnect capacitors C1 and C2 and contacts 52 close to connect capacitors C2 and C3. The instantaneous voltage across the emitter-base-one circuit of uni-junction transistor U will again be sufficient to cause the conduction of emitter-base-one current.

Sectionalizing switches are usually arranged to operate after the third appearance and disappearance of fault current. Should the fault in feeder line 14 persist after the second opening and closing operation of the interrupter 12, therefore, the latter will open for a third time causing relay 48 to drop out and couple capacitors C2 and C3 for a third time.

While the instantaneous voltage across the emitter-base-one circuit of uni-junction U will again be equal to the difference between the voltages across capacitors C2 and C3, the parameters of the integrating circuit 35 and the switching circuit 36 will be so chosen that the instantaneous voltage across the emitter-base-one circuit of uni-junction U will be insufficient to cause uni-junction U to conduct emitter-base-one current. Upon this event, a continuous voltage will appear across the resistor R2, so that capacitor C4 will charge to a relatively high level. This causes controlled rectifier S to become conductive, thereby completing an energizing circuit from the energy source capacitor C1 through the trip coil 53, which, in turn, opens the main switch 37. The fault is thereby isolated in the feeder line 14 and the interrupter 12 then closes.

When the circuit breaker 12 closes in on a fault in feeder line 14 after an initial opening operation, system voltage will reappear, but this will normally be insufficient to cause relay 66 to close. However, it is possible that when a fault occurs in a remote portion of feeder line 14, line voltage will be sufficiently high upon the closing of circuit breaker 12 to actuate relay 66 and thereby close contacts 68. Diode D4 is necessary, therefore, to prevent the discharge of capacitor C3 upon such an occurrence.

Because fault current flow is from the source 10 to the point of the fault, no fault current will be sensed by the overcurrent coil 70 of sectionalizing switch 15 upon the occurrence of a fault in feeder line 14. As a result, switch 15 will remain inactive as the interrupter 12 cycles so that after sectionalizing switch 16 opens to isolate the fault in feeder line 14, service will be resumed in feeder line 13 upon the closing of interrupter 12.

Should a permanent fault occur in the feeder line 13, on the other hand, the fault current will not be sensed by the current transformers 22a or 22b of repeating circuit interrupters 18a and 18b and, accordingly, these devices will remain inactive. Accordingly, the fault current will be interrupted by the station breaker 12. As a result, the appearance and disappearance of fault current in feeder line 13 will be sensed by a current transformer 70 of sectionalizing switch 15. In addition, potential transformer 71 will sense the absence of voltage in feeder line 13 when the repeating circuit interrupter 12 opens. If the fault proves permanent, therefore, the sectionalizing switch 15 will integrate the appearances and disappearances of fault current as the repeating circuit interrupter 12 opens and closes and, after three such operations, the sectionalizing switch 15 will open to isolate the fault in the feeder line 13. Repeating circuit interrupter 12 may then close to restore service in the feeder line 14 and the branch lines 14a and 14b.

Should a fault appear in one of the branch lines, such as 14a, for example, it is not desirable to have the sectionalizing switch 16 operate or else service will also be interrupted in the non-faulted branch line 14b. Because the overcurrent coil 42 of sectionalizing switch 16 cannot distinguish between a fault that will be interrupted by the circuit interrupter 12 or one of the branch line circuit interrupters 19a or 19b, the voltage sensing portion 38 is provided.

Upon the occurrence of a fault in branch line 14a, fault current will flow from the source through the current transformer 42 of sectionalizing switch 16 and the overcurrent sensing coil 23a of circuit interrupter 19a, the latter of which will subsequently open. This appearance and disappearance of fault current in feeder line 14 will cause the operation of relay 48. However, while the opening of the interrupter 19a will interrupt the flow of fault current in feeder line 14, line voltage will continue to appear. As a result, relay 66 will remain energized to short circuit the charging circuit to capacitor C3. For this reason, charge cannot accumulate on capacitor C3 so that repeating circuit interrupter 19a will cycle to lockout to isolate the fault in feeder line 14a while the sectionalizing switch 16a will remain inactive. In this manner, the fault is located in the faulted feeder line 14a while service continues in the unfaulted feeder line 14b.

In a similar manner, should a fault occur in feeder line 13a, for example, the circuit interrupter 18a will open to interrupt the flow of fault current from the source 10 to a point of the fault. This appearance and disappearance of fault current flowing through feeder line 13 will be sensed by the overcurrent coil 70 of the sectionalizer 15. However, because voltage in feeder line 13 will not disappear when the contacts of the circuit interrupter 18a open, the sectionalizer 15 will sense voltage through transformer 71 and, accordingly, will remain inactive. Should the fault in branch line 13a be permanent, therefore, the circuit interrupter 18a will cycle to lockout, whereby the fault will be isolated and service will be continued in the branch line 13b.

While only a single embodiment of the instant invention has been shown and described, and while the invention has been described in relation to one particular type of sectionalizing switch, it is not intended to be limited thereby but only by the scope of the appended claims.

I claim:

1. A sectionalizing switch for protecting an electrical system having a source side and a load side and including switch means in circuit with said system, output means coupled to said switch means and actuable to initiate a switch opening operation, first means coupled to said system and responsive to the appearance and disappearance of an overcurrent therein and normally operable to actuate said output means after a predetermined number of appearances and disappearances of said overcurrent to open said switch means, and second means coupled to said system and to said output means and responsive to source side system integrity to prevent the operation of said output means.

2. A sectionalizing switch for protecting an electrical system and including switch means in circuit with said system, overload sensing means coupled to said system and responsive to the appearance and disappearance of an overcurrent therein for actuating said output means after a predetermined number of appearances and disappearances of said overcurrent to open said switch means, and means coupled to said system and to said output means and responsive to the existence of system voltage to prevent the opening of said switch means.

3. A sectionalizing switch for protecting an electrical system and including switch means in circuit with said system, first means coupled to said system and responsive to the appearance and disappearance of an overcurrent therein for providing an output signal after a predetermined number of appearances and disappearances of said overcurrent, output means coupled to said first means and to said switch means and operable to open said switch means upon the occurrence of said output signal, and second means coupled to said system and to said output means and responsive to the existence of system voltage to prevent the opening of said switch means.

4. A device for protecting an electrical system having a source side and a load side and including switch means in circuit with said system, first means coupled to said system for sensing the appearance and disappearance of fault current therein, second means coupled to said first means for counting the number of appearances and disappearances of fault current in said system, third means coupled to said second means and to said switch means and operable to initiate a switch opening operation after said second means counts a predetermined number of appearances and disappearances of fault current, and fourth means coupled to said system and responsive to the existence of source side system integrity to prevent the opening of said switch means.

5. A sectionalizing switch for protecting an electrical system and including switch means in circuit with said system, fault current sensing means coupled to said system for sensing the appearance and disappearance of fault current therein, integrating means coupled to said fault current sensing means for counting the number of appearances and disappearances of fault current in said system, output means coupled to said integrating means and to said switch means and operable to open said switch means after said integrating means counts a predetermined number of appearances and disappearances of fault current and voltage responsive means coupled to said system and responsive to the existence of system voltage to prevent the opening of said switch means.

6. A sectionalizing switch for protecting an electrical system and including switch means in circuit with said system, fault current sensing means coupled to said system for producing a first electrical signal upon the appearance and disappearance of fault current therein, integrating means coupled to said fault current sensing means for producing a second electrical signal after a predetermined number of occurrences of said first electrical signal, output means coupled to said integrating means and to said switch means and operable to open said switch means upon the occurrence of said second electrical signal, and voltage responsive means coupled to said system and responsive to the existence of system voltage to prevent the operation of said integrating means.

7. In a protective device having switch means disposed in an electrical circuit, the combination of first and second electrical energy storage means and an electrical energy source, condition responsive means connected to said system and operable each time a predetermined circuit condition occurs to transfer a predetermined quantity of energy from said energy source to said first energy storage means, said condition responsive means also being operable each time said predetermined circuit condition disappears to transfer a predetermined quantity of energy from said first energy storage means to said second energy storage means, means connected to said first and second energy storage means for opening said switch means when the energy on said second energy storage means exceeds a predetermined value, and means coupled to said system and responsive to the presence of voltage therein for preventing the opening of said switch means.

8. In a protective device having switch means disposed in an electrical circuit, the combination of first and second electrical energy storage means and an electrical energy source, condition responsive means connected to said system and operable each time a predetermined circuit condition occurs to transfer a predetermined quantity of energy from said energy source to said first energy storage means, said condition responsive means also being operable to transfer a predetermined portion of the energy from said first energy storage means to said second energy storage means each time said circuit condition disappears, means connected to said first and second energy storage means for opening said switch means when the energy on said second energy storage means exceeds a predetermined value, and means coupled to said system and responsive to the presence of voltage therein for preventing the transfer of energy from said first energy storage means to said second energy storage means.

9. In a switch device having switch means disposed in an electrical circuit, the combination of capacitor means, a source of electrical energy, relay means connected to said system and operable each time a predetermined circuit condition appears and disappears to transfer a predetermined quantity of charge from said energy source to said capacitor means, and electroresponsive switch opening means coupled to said capacitor means and operable to initiate a switch opening operation when the charge on said capacitor means exceeds a predetermined value following a predetermined number of occurrences of said circuit condition, and second relay means coupled to said system and responsive to the presence of system voltage to prevent the charging of said capacitor means.

10. In a switch device having switch means disposed in an electrical circuit, the combination of first and second capacitor means, a source of electrical energy, first relay means connected to said system and operable each time a predetermined circuit condition occurs to connect said first capacitor means to said energy source so that a quantity of charge is transferred thereto, said first relay means also being operable to connect said first and second capacitor means each time said circuit condition disappears so that a portion of the charge on said first capacitor means flows to the second, and voltage responsive means connected to said first and second capacitor means for completing the charging circuit therebetween when the difference in their voltages exceeds its operating potential, electroresponsive switch opening means shunting said voltage responsive means, the flow of energy to said second capacitor means flowing through said electroresponsive means to open said switch means when said voltage difference falls below said operating potential following a predetermined number of occurrences of said circuit condition, and second relay means coupled to said system and responsive to the presence of system voltage to hold said second capacitor means in a discharged condition.

11. In an electrical power system having a source of power, a main line connected to said source of power, a plurality of feeder lines radiating from said main line, at least one branch line radiating from each of said feeder lines, an opening time delayed repeating circuit interrupter disposed in said main line, an opening time delayed repeating circuit interrupter disposed in each of said branch lines, sectionalizing means disposed in each of said feeder lines adjacent said main line, each of said sectionalizing means normally being operable to open circuit their respective feeder lines after a predetermined number of appearances and disappearances of overload current in its respective feeder line or the branch lines connected thereto, each of said sectionalizing means also including line integrity sensing means coupled to its respective feeder line and operable in response to feeder line system integrity to prevent the operation of their respective sectionalizing means, the repeating circuit interrupter in said main line having a longer opening time delay than the repeating circuit interrupters in said branch lines.

12. In an electrical power system having a source of power, a main line connected to said source of power, a plurality of feeder lines radiating from said main line, a plurality of branch lines radiating from each of said feeder lines, an opening time delayed repeating circuit interrupter disposed in said main line, an opening time delayed repeating circuit interrupter disposed in each of said branch lines, a sectionalizing switch disposed in each of said feeder lines adjacent said main line, each of said sectionalizing switches normally being operable to open circuit their respective feeder lines after a predetermined number of appearances and disappearances of overload current in its respective feeder line or the branch lines connected thereto, each of said sectionalizing switches also including voltage responsive means coupled to its respective feeder line and operable in response to the presence of voltage therein to prevent the operation of their respective sectionalizing switches, the repeating circuit interrupter in said main line having a longer opening time delay than the repeating circuit interrupters in said branch lines.

13. In an electrical power system having a source of power, a first opening time delayed repeating circuit interrupter connected in said system and proximate to said source, a second opening time delayed repeating circuit interrupter connected in said system and remote from said source, said first repeating circuit interrupter having a longer opening time delay than said second repeating circuit interrupter, sectionalizing means disposed between said circuit interrupters and being constructed and arranged to open circuit said system after a predetermined number of appearances and disappearances of overload current in said system, said sectionalizing means also including line integrity sensing means for sensing the existence of system integrity between said sectionalizing means and said source and operable in response to system integrity between said sectionalizer and said source to prevent the operation of said sectionalizing means.

14. Electrical power system set forth in claim 13 wherein said system integrity sensing means includes means coupled to said system for sensing the existence of an electrical quantity therein and second means responsive to said first means for disabling said sectionalizing means when said electrical quantity exists in said system.

References Cited by the Examiner
UNITED STATES PATENTS

| | | | |
|---|---|---|---|
| 2,942,154 | 6/1960 | Van Ryan | 317—29 X |
| 3,127,542 | 3/1964 | Riebs | 317—23 X |
| 3,144,586 | 8/1964 | Gambale | 317—33 X |
| 3,249,811 | 5/1966 | Price | 317—23 X |
| 3,259,802 | 7/1966 | Steen | 317—26 X |

MILTON O. HIRSHFIELD, *Primary Examiner.*

R. V. LUPO, *Assistant Examiner.*